(12) United States Patent
Sallam et al.

(10) Patent No.: US 8,291,494 B1
(45) Date of Patent: Oct. 16, 2012

(54) SYSTEM, METHOD, AND COMPUTER PROGRAM PRODUCT FOR DETECTING UNWANTED ACTIVITY ASSOCIATED WITH AN OBJECT, BASED ON AN ATTRIBUTE ASSOCIATED WITH THE OBJECT

(75) Inventors: Ahmed Said Sallam, Sunnyvale, CA (US); Joel R. Spurlock, Newberg, OR (US)

(73) Assignee: McAfee, Inc., Santa Clara, CA (US)

( * ) Notice: Subject to any disclaimer, the term of this patent is extended or adjusted under 35 U.S.C. 154(b) by 840 days.

(21) Appl. No.: 12/169,420

(22) Filed: Jul. 8, 2008

(51) Int. Cl.
*G06F 11/00* (2006.01)
(52) U.S. Cl. .......................................... 726/22
(58) Field of Classification Search ................ 726/22
See application file for complete search history.

(56) References Cited

U.S. PATENT DOCUMENTS

| | | | | |
|---|---|---|---|---|
| 5,987,611 A | * | 11/1999 | Freund | 726/4 |
| 2003/0135791 A1 | * | 7/2003 | Natvig | 714/38 |
| 2007/0240217 A1 | * | 10/2007 | Tuvell et al. | 726/24 |
| 2008/0127334 A1 | * | 5/2008 | Gassoway | 726/22 |

* cited by examiner

*Primary Examiner* — Cordelia Zecher
(74) *Attorney, Agent, or Firm* — Patent Capital Group (57) ABSTRACT

A system, method, and computer program product are provided for detecting unwanted activity associated with an object, based on an attribute associated with the object. In use, an object is labeled with an attribute of a predetermined behavior based on detection of the predetermined behavior in association with the object. Additionally, unwanted activity associated with the object is detected, utilizing the attribute.

15 Claims, 5 Drawing Sheets

SYSTEM, METHOD, AND COMPUTER PROGRAM PRODUCT FOR DETECTING UNWANTED ACTIVITY ASSOCIATED WITH AN OBJECT, BASED ON AN ATTRIBUTE ASSOCIATED WITH THE OBJECT

FIELD OF THE INVENTION

The present invention relates to systems monitoring, and more particularly to monitoring and controlling events within a system.

BACKGROUND

Traditionally, the security of systems has been provided via an ability to monitor and control events within such systems. For example, monitoring events within a system has generally been utilized to reveal malware, inefficiencies, or other undesired or unanticipated behavior within the system, such that the aforementioned types of behaviors may then be controlled. However, traditional techniques utilized for monitoring and controlling events within a system have generally exhibited various limitations.

For example, determining whether an event is associated with unwanted behaviors may necessitate referencing one or more additional events that have occurred prior to such event, where the combination of events is analyzed to identify the unwanted behavior. As a result, traditional techniques have conventionally cached events so that they are available for analysis when later related events occur. However, this oftentimes results in the consumption of excessive cache memory space, resource consumption, etc.

There is thus a need for overcoming these and/or other issues associated with the prior art.

SUMMARY

A system, method, and computer program product are provided for detecting unwanted activity associated with an object, based on an attribute associated with the object. In use, an object is labeled with an attribute of a predetermined behavior based on detection of the predetermined behavior in association with the object. Additionally, unwanted activity associated with the object is detected, utilizing the attribute.

DETAILED DESCRIPTION

Figure 1:
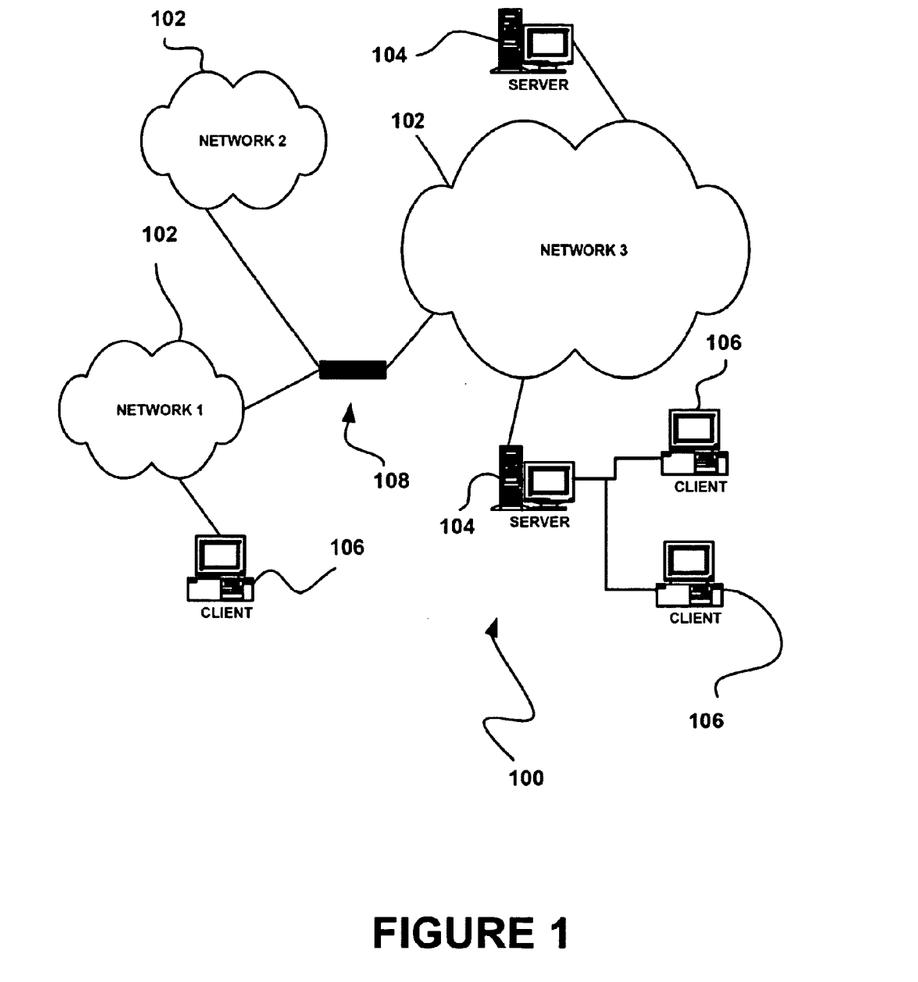
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
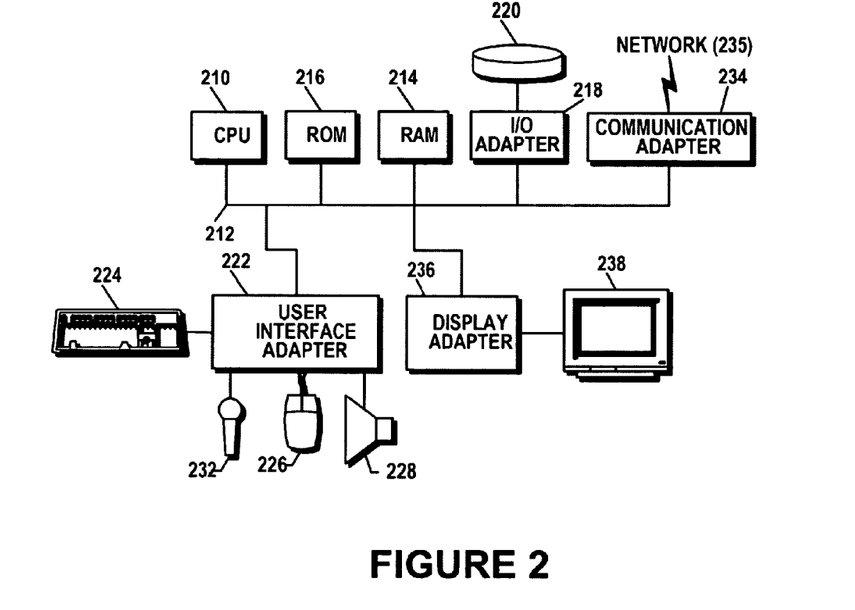
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
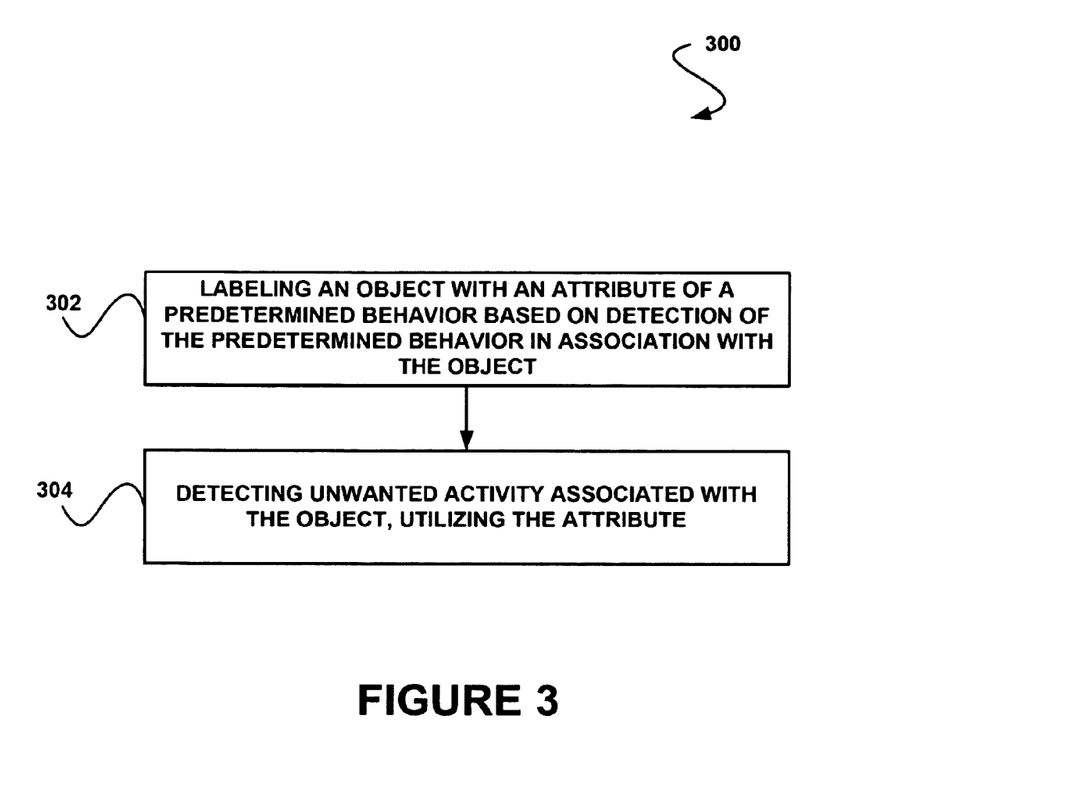
FIG. 3 shows a method for detecting unwanted activity associated with an object, based on an attribute associated with the object, in accordance with one embodiment.

FIG. 3 shows a method 300 for detecting unwanted activity associated with an object, based on an attribute associated with the object, in accordance with one embodiment. As an option, the method 300 may be carried out in the context of the architecture and environment of FIGS. 1 and/or 2. Of course, however, the method 300 may be carried out in any desired environment.

As shown in operation 302, an object is labeled with an attribute of a predetermined behavior based on detection of the predetermined behavior in association with the object. In the context of the present description, the object may include any object capable of being associated with predetermined behavior. For example, the object may include a control, an executable program, a code segment, a process, a thread, a network node, a workstation, etc.

In addition, the predetermined behavior may include any behavior capable of being associated with the object that is predetermined (e.g. of a predetermined type, etc.). In one embodiment, the predetermined behavior may be performed on the object (e.g. downloading the object, installing the object, accessing the object, executing the object, etc.). In another embodiment, the predetermined behavior may be performed by the object. Thus, in various exemplary embodiments, the predetermined behavior may include the downloading of a file, the installation of a program, the sending of an electronic mail message, the creation of a new file by the object, the creation of a new registry entry, the calling of a function, etc. As an option, the behavior may be predetermined by having an indication thereof in a rule, policy, etc. (e.g. configured by a user, etc.).

In one embodiment, the predetermined behavior may be detected based on monitoring of the object. For example, a memory image of the object may be monitored. In another example, a hard disk of the object may be monitored. In yet another example, an operation performed by the object on a local system and/or on a network may be monitored.

Also, in one example, the object may be contained within a research and/or debugging environment. In another example, the object may be contained within a personal computer. In yet another example, the object may be monitored by an intrusion prevention system. In still another embodiment, the monitoring may occur randomly, constantly, according to a schedule, etc.

Additionally, in one embodiment, the predetermined behavior may be detected by comparing behavior associated with the object to a rule (e.g. the rule indicating the behavior, etc.). For example, the predetermined behavior may be detected if the behavior associated with the object matches the rule. In another embodiment, the rule used in the comparing may include one of a plurality of rules extracted from a compound rule.

To this end, in response to detection of the predetermined behavior in association with the object, the object may optionally be labeled with an attribute of the predetermined behavior. Further, the attribute of the predetermined behavior may include any data representative of the predetermined behavior in association with the object. In one embodiment, the attribute may include a string value. For example, the attribute may include a uniform resource locator (URL) that is related to the predetermined behavior. In another embodiment, the attribute may include a watermark that summarizes the predetermined behavior.

In yet other embodiments, the attribute may include a Boolean value, an integer value, an unsigned integer value, a floating point number value, etc. Also, in one embodiment, the attribute may be created automatically (e.g. based on a characteristic of the predetermined behavior, such as a source of the predetermined behavior, a target of the predetermined behavior, etc.). In another embodiment, the attribute may be predefined. Just by way of example, the attribute may be predefined within the rule utilized to detect the predetermined behavior.

Further still, in one embodiment, the labeling may include flagging the object with the attribute. In another embodiment, the object may be labeled by embedding the attribute within the object. In still another embodiment, the object may be labeled by storing the attribute in association with an identifier of the object in a database (e.g. a database of a system monitoring for the predetermined behavior, a database in an external storage utilized for storing indicators of events associated with objects, etc.). Of course, however, the object may be labeled with the attribute in any manner.

Additionally, as shown in operation 304, unwanted activity associated with the object is detected, utilizing the attribute. In one embodiment, the unwanted activity may include malware activity. For example, the unwanted activity may include installation, execution, or propagation of malware.

In another embodiment, the unwanted activity may involve a network. For example, the unwanted activity may include an attack on the network. In another embodiment, the unwanted activity may include the sending or receipt of unsolicited electronic mail messages. Of course, however, the unwanted activity may include any activity associated with the object that is determined to be unwanted.

Further, in one embodiment, the unwanted activity may be detected by determining a value of the attribute. For example, the value of the attribute may indicate that all or a portion of the unwanted activity associated with the object has occurred. In another embodiment, the unwanted activity may be detected by confirming the existence of the attribute. For example, the existence of the attribute may indicate that all or a portion of the unwanted activity associated with the object has occurred.

In yet another embodiment, the attribute may be analyzed along with additional attributes with which the object is labeled in order to detect the unwanted activity associated with the object. For example, the attribute and the additional attributes may be evaluated utilizing a behavioral rule associated with the object in order to detect the unwanted activity associated with the object. Of course, however, unwanted activity associated with the object may be detected in any manner that utilizes the attribute with which the object is labeled.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
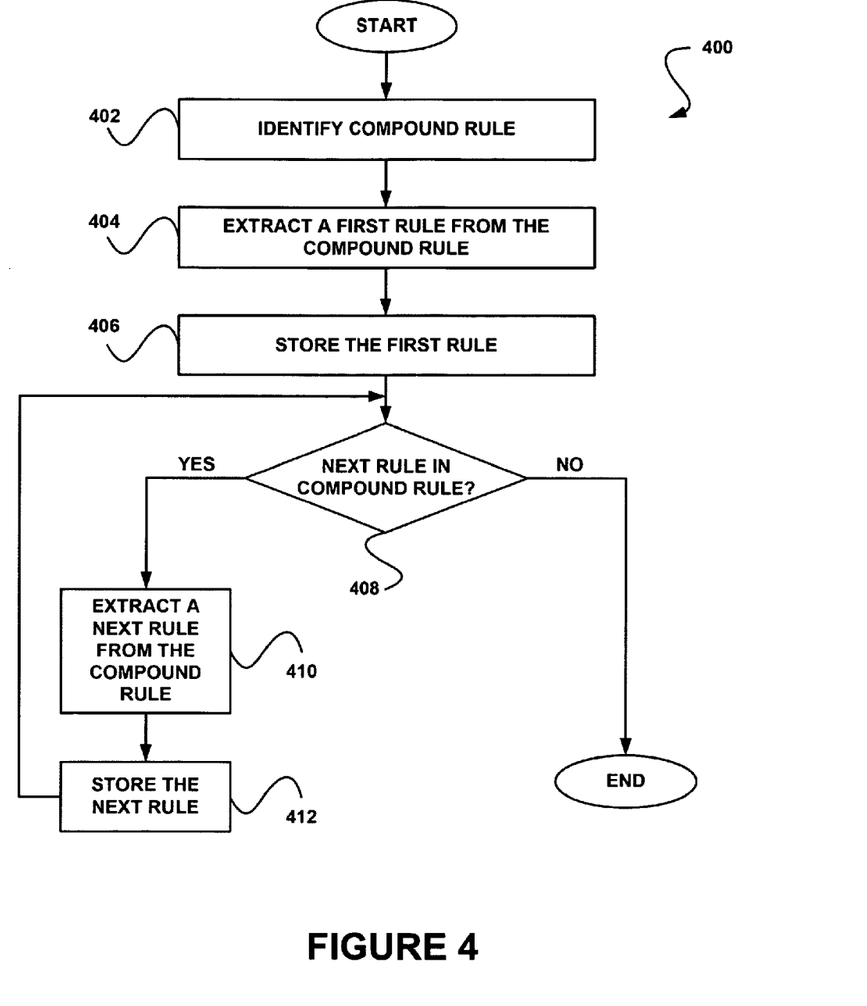
FIG. 4 shows a method for extracting and storing rules from a compound rule, in accordance with another embodiment.

FIG. 4 shows a method 400 for extracting and storing rules from a compound rule, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a compound rule is identified. In the context of the current embodiment, the compound rule may include any combination of two or more rules. For example, the compound rule may contain multiple simple rules. As an option, the compound rule may be utilized for detecting unwanted activity associated with an object. For example, the compound rule may be used as part of a security policy in order to detect, react to, and/or control particular behavior associated with the object.

In one embodiment, the rules of the compound rule may each be utilized for detecting predetermined behavior in association with the object. For example, if a rule of the compound rule matches behavior associated with the object, the object may be labeled with an attribute indicated by such rule. In yet another embodiment, the compound rule may include two or more operators (e.g. Boolean operators, etc.), logic gates, or any other components for detecting unwanted activity.

As an option, the compound rule may be identified in a database of rules utilized for detecting unwanted activity. For example, the compound rule may be identified by identifying a Boolean operator existing within the compound rule. In another embodiment, the compound rule may be identified in response to creation of the compound rule (e.g. by a user, etc.). Of course, however, the compound rule may be identified in any desired manner.

Additionally, as shown in operation 404, a first rule is extracted from the compound rule. In the context of the current embodiment, the first rule may include the first occurrence of a rule in the compound rule. Optionally, the first rule may be identified by identifying a portion of the compound rule that is previous to a first operator within the compound rule. In one embodiment, the format of the first rule may be changed during extraction (e.g. by associating a predefined attribute with the first rule, etc.).

Further, the first rule is stored. See operation 406. In one embodiment, the first rule may be hard-coded. In another embodiment, the first rule may be stored in a rule database. In yet another embodiment, the first rule may be stored in conjunction with an identifier of the object associated to which the rule is applicable. Of course, however, the first rule may be stored in any manner.

Further still, in decision 408 it is determined whether the compound rule contains a next rule. For example, its may be determined whether an additional rule follows the first rule within the compound rule. As another example, it may be determined whether an additional portion of the compound rule exists after the first operator of the compound rule. In yet another example, it may be determined whether the end of the compound rule has been reached.

If it is determined in decision 408 that the compound rule does not contain a next rule, the method 400 terminates. If, however, it is determined in decision 408 that the compound rule contains a next rule, in operation 410 the next rule is extracted from the compound rule. Additionally, in operation 412 the next rule is stored. The determination as to whether the compound rule contains an additional rule is again determined (decision 408). Accordingly, a plurality of rules may be extracted from the compound rule and stored.

In this way, compound rules may be divided into simplified sets of rules. As an option, rules that have been extracted from the compound rule may further be divided by extracting additional rules therefrom. For example, rules may be extracted from the compound rule in iterations until each rule extracted from the compound rule has no dependencies.

In one example, the compound rule may be identified as the following statement: "If a program is downloaded from website X and the program starts to send an HTML email with a URL that points to its online location, then prevent the email operation." As a result, the first rule may be extracted from the compound rule and stored as follows: "If a program is downloaded from website X, then label the program with an attribute 'downloaded_location=website X.'"

Additionally, it may then be determined that an additional rule exists in the compound rule. Therefore, the next rule may be extracted from the compound rule and stored as follows: "If the program starts to send an HTML email with a URL equal to 'program_attribute->downloaded_location,' then prevent the email operation." In this way, the rules may be utilized to label an object (e.g. the program) with associated attributes, such that storage of events associated with the object, such as in a cache of events, for determining whether each portion of the compound rule has been met may be prevented.

In another example, the compound rule may be identified as the following statement: "If an application is downloaded by web browser X, and if that application downloads an executable from the Internet, if the first application adds an entry in the registry database run key to point to the downloaded executable, if the downloaded executable executes and copies itself over a network share, then prevent the operation and take repair actions."

After identifying the above compound rule, the first rule may be extracted from the compound rule and stored as follows: "If an application is downloaded by web browser X, then mark the downloaded application with an attribute 'downloaded_by_web_browser_X=TRUE'." Therefore, the first rule may indicate a first portion of the compound rule, namely the web browser X web download.

Additionally, the next rule may be extracted from the compound rule and stored as follows: "If an application downloads an executable from the Internet, then mark the downloaded executable with the attribute 'downloaded_from_internet=TRUE'." As a result, the next rule may deal with a subsequent portion of the compound rule, namely the executable web download.

Further, a third rule may be extracted from the compound rule and stored as follows: "If an application marked with the attribute 'downloaded_by_web_browser_X=TRUE' adds an entry in the registry database run key to point to an executable with attribute 'downloaded_from_Internet=TRUE,' then mark the executable with the attribute 'intermediateState0001=TRUE'." As a result, the third rule may indicate a registry database key creation.

Further still, a fourth rule may be extracted from the compound rule and stored as follows: "If an executable marked with attribute 'intermediateState0001=TRUE' copies itself over a network share, then prevent the operation and take repair actions." As a result, the fourth rule may indicate the copying of the file over the network share.

In this way, compound rules that deal with the occurrence of many events may be divided into simple rules, which each deal with a single event. Additionally, an evaluation of the simplified rules may only require access to the attributes labeled to the relevant object.

Figure 5:
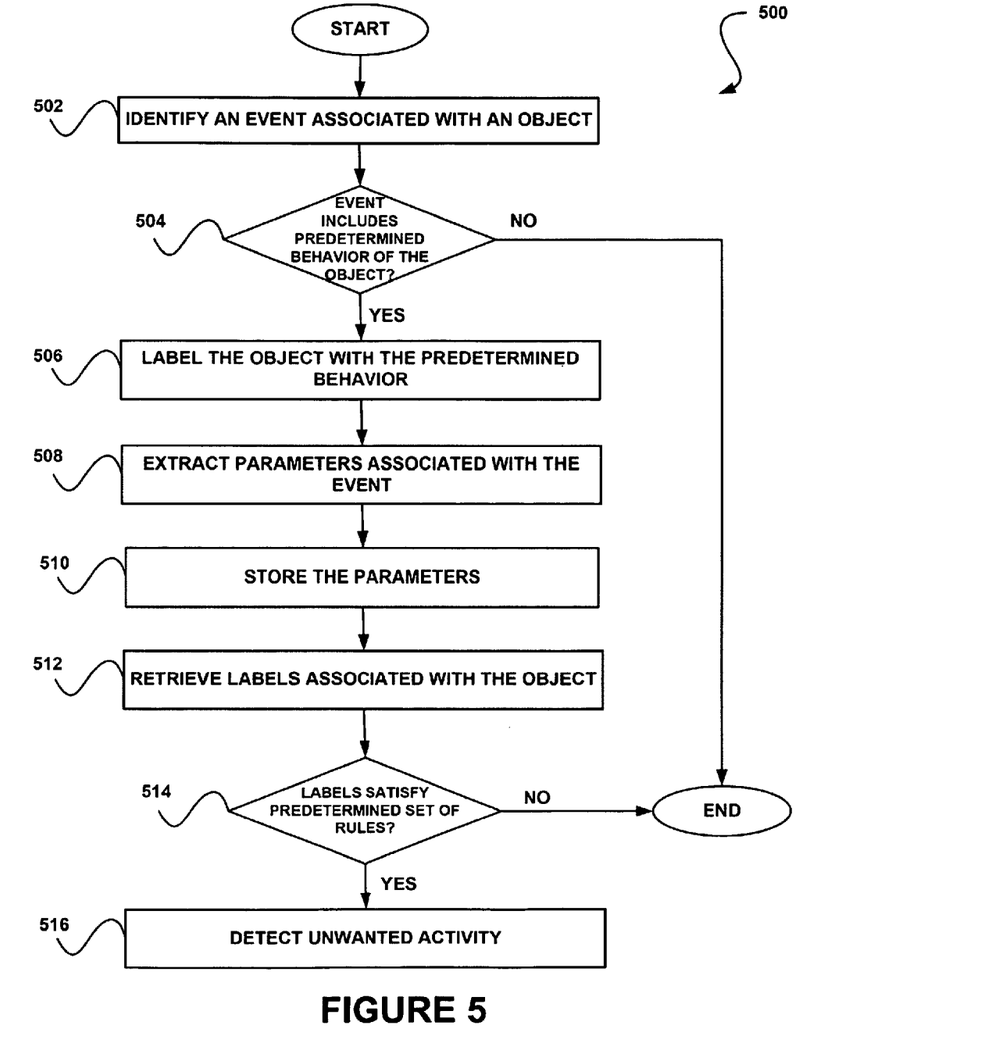
FIG. 5 shows a method for detecting unwanted activity associated with an object, in accordance with yet another embodiment.

FIG. 5 shows a method 500 for detecting unwanted activity associated with an object, in accordance with yet another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in operation 502, an event associated with an object is identified. The event may be performed by the object as an option. As another option, the event may be performed on the object.

In one embodiment, the event may include the creation of a file. In another embodiment, the event may include the sending of an electronic mail message. In yet another embodiment, the event may include the downloading of an application. Additionally, the event may be identified by monitoring the object. Of course, however, any event associated with the object may be identified utilizing any technique.

Additionally, in decision 504, it is determined whether the event includes predetermined behavior of the object. The predetermined behavior may be indicated by a rule, for example. In one embodiment, one or more elements of the event may be compared against one or more rules associated with (e.g. applicable to, etc.) the object. For example, if the event or a portion of the event meets the requirements of a rule associated with the object, then the event may be determined to include the predetermined behavior of the object. If it is determined in decision 504 that the event does not include predetermined behavior of the object, the method 500 terminates.

If it is determined in decision 504 that the event includes the predetermined behavior of the object, then in operation 506 the object is labeled with the predetermined behavior (e.g. with a label of the predetermined event). In one embodiment, the label may include a flag with a summary of the predetermined behavior that is associated with the object. In another embodiment, the label may include an identifier or other indicator of the predetermined behavior that is embedded within the object.

In another embodiment, the label may include a variable that is associated with the object and that is updated to represent that the predetermined behavior has occurred. Additionally, in one embodiment, the label may be aggregated with at least one other label of the object in order to generate a compound label. Of course, however, the object may be labeled with the predetermined behavior in any manner.

Further, in operation 508, parameters associated with the event are extracted. In the context of the present embodiment, the parameters may include any information that is associated with the event. In various embodiments, the parameters may include one or more actions that are taken during the event, one or more settings of the object associated with the event, identifiers of elements associated with the event, etc.

For example, if the event includes an object calling a file creation function, an identifier of the object may be extracted from the file creation function call. Additionally, system information of the object may be extracted, such as a process identifier, a command line, process security information, a process start time, process folder and/or file names, etc. Further, a file name, file access information, and folder name requested by the object may be extracted. Further still, thread information associated with the object may be extracted, such as a thread identifier, thread process information, thread content information, thread priority, etc.

Further still, in operation 510, the parameters are stored. In one embodiment, the parameters may be stored in a cache. In another embodiment, the parameters may be stored in a database. In yet another embodiment, the parameters may be stored in an external storage facility. Of course, however, the parameters may be stored in any storage location. Further, in another embodiment, the parameters may be stored in association with the labels associated with the object and/or in association with an identifier of the object.

In addition, in operation 512, labels associated with the object are retrieved. In one embodiment, the labels may be extracted from the object. In another embodiment, variables contained within the labels may be extracted. In still another embodiment, the labels may be retrieved from a label database. In yet another embodiment, the labels may be retrieved from a cache.

Furthermore, in decision 514, it is determined whether the labels satisfy a predetermined set of rules. For example, it may be determined whether the labels satisfy each of a plurality of rules within a compound rule. If it is determined in decision 514 that the labels do not satisfy a predetermined set of rules, the method 500 terminates.

If it is determined in decision 514 that the labels satisfy a predetermined set of rules, then in operation 516 unwanted activity is detected. In one embodiment, one or more actions may be taken in response to the detection of unwanted activity. For example, the object may be deleted, a transmission of data may be stopped, a warning may be sent to an administrator, etc.

Additionally, in one embodiment, the labels may be maintained in a storage area. The storage area may include a database, a local storage device, a remote storage device, etc. As a result, the labels may be available after a system that uses the labels reboots. Further, in another embodiment, if the object is terminated, the labels associated with the object may be removed.

Further, in yet another embodiment, the labels may be used in an analysis of the object and its environment. For example, an environment including the object may be created and pre-populated with one or more analysis tools. One example of the environment may include a debugging environment. Another example of the environment may include a honeynet or other network simulation. Still another example of the environment may include a consumer-based environment. In another example, the object may include a node in a honeynet, a malware program in a debugging environment, etc.

Additionally, during interaction with the object in the environment, events that occur that include predetermined behavior of the object may be recorded, and the object may be labeled with an attribute of the predetermined behavior. Also, the labels associated with the object may be collected after the interaction with the object. In one embodiment, labels may be collected after interaction with multiple objects in multiple environments in order to determine similarities between different objects in different environments.

For example, labels may be collected after running a virus object in various environments in order to detect a manner in which the virus interacts with different environments. The labels may then be run against one or more antivirus signatures in order to analyze the effectiveness of antivirus measures.

Further, a state of one or more additional elements in the environment, such as a memory or hard disk image, may also be analyzed in addition to the labels. In another embodiment, the labels may be stored in a centralized location in order to simplify analysis of different objects and environments. In this way, labels from multiple sources (e.g. devices, etc.) may be combined for each object and may be made available to additional devices, thereby simplifying detection of the object and analysis of behavior of the object across different platforms.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for performing operations, comprising:
   monitoring an operation performed by an object using an intrusion system;
   labeling the object with an attribute of a predetermined behavior based on detection of the predetermined behavior in association with the object, the attribute including a uniform resource locator (URL) that is embedded into the object, and wherein the detection of the predetermined behavior includes matching a behavior associated with the object to a compound rule;
   extracting a plurality of rules from the compound rule; and
   extracting additional rules from the plurality of rules in iterations until each rule extracted has no further dependencies and a reaction to the object is resolved without storing an event associated with the object in a cache.

2. The computer program product of claim 1, wherein the labeling includes flagging the object with the attribute.

3. The computer program product of claim 1, wherein the object includes an executable program.

4. The computer program product of claim 1, wherein the attribute includes a string value.

5. The computer program product of claim 1, further comprising:
   identifying a particular event associated with the object.

6. The computer program product of claim 5, further comprising:
determining whether the particular event includes the predetermined behavior.

7. The computer program product of claim 5, wherein parameters associated with the particular event are extracted.

8. The computer program product of claim 7, wherein the parameters are stored.

9. The computer program product of claim 1, wherein the object is associated with unwanted activity.

10. The computer program product of claim 9, wherein the unwanted activity is detected by analyzing the attribute and a plurality of additional attributes with which the object is labeled.

11. The computer product of claim 9, wherein the unwanted activity is detected by determining a value of the attribute.

12. The computer program product of claim 11, wherein the value of the attribute indicates that at least a portion of the unwanted activity associated with the object has occurred.

13. A method, comprising:
monitoring an operation performed by an object using an intrusion system;
labeling the object with an attribute of a predetermined behavior based on detection of the predetermined behavior in association with the object, the attribute including a uniform resource locator (URL) that is embedded into the object, and wherein the detection of the predetermined behavior includes matching a behavior associated with the object to a compound rule;
extracting a plurality of rules from the compound rule in; and
extracting additional rules from the plurality of rules in iterations until each rule extracted has no further dependencies and a reaction to the object is resolved without storing an event associated with the object in a cache.

14. A system, comprising:
a processor coupled to a memory, the system being configured for:
monitoring an operation performed by an object using an intrusion system;
labeling the object with an attribute of a predetermined behavior based on detection of the predetermined behavior in association with the object, the attribute including a uniform resource locator (URL) that is embedded into the object, and wherein the detection of the predetermined behavior includes matching a behavior associated with the object to a compound rule;
extracting a plurality of rules from the compound rule; and
extracting additional rules from the plurality of rules in iterations until each rule extracted has no further dependencies and a reaction to the object is resolved without storing an event associated with the object in a cache.

15. The system of claim 14, wherein the processor remains in communication with the memory and a network adapter via a bus.

* * * * *